(12) United States Patent
Onose et al.

(10) Patent No.: US 7,570,898 B2
(45) Date of Patent: Aug. 4, 2009

(54) IMAGE FORMING APPARATUS INCLUDING A WIRING HOUSING MEMBER

(75) Inventors: Atsushi Onose, Ibaraki (JP); Takamitsu Ikematsu, Ibaraki (JP); Katsumi Kumada, Ibaraki (JP); Mitsuhiro Furuse, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 290 days.

(21) Appl. No.: 11/512,182

(22) Filed: Aug. 30, 2006

(65) Prior Publication Data

US 2007/0047024 A1   Mar. 1, 2007

(30) Foreign Application Priority Data

Aug. 31, 2005   (JP) ............................. P2005-251077

(51) Int. Cl.
*G03G 15/00* (2006.01)
*G03G 21/16* (2006.01)

(52) U.S. Cl. ......................................... 399/90; 399/125

(58) Field of Classification Search ................... 399/90, 399/107, 125, 367
See application file for complete search history.

(56) References Cited

U.S. PATENT DOCUMENTS 5,201,854 A * 4/1993 Ahl et al. ................. 399/90 X
7,133,626 B2 * 11/2006 Kaiga et al. ............. 399/125 X
7,263,312 B2 * 8/2007 Park ....................... 399/125 X
7,272,338 B2 * 9/2007 Karasawa et al. ........... 399/107
7,298,979 B2 * 11/2007 Kitozaki ................. 399/107 X
2004/0096237 A1 * 5/2004 Asai ........................... 399/107

FOREIGN PATENT DOCUMENTS

JP   2002-62705   2/2002

* cited by examiner

*Primary Examiner*—Sandra L Brase
(74) *Attorney, Agent, or Firm*—McGinn IP Law Group, PLLC

(57) ABSTRACT

According to an aspect of the invention, an image forming apparatus comprises: a manuscript reading device reading a manuscript and converting the manuscript into an image signal; a recording device printing on paper; at least one rotating support member connecting the manuscript reading device and the recording device, and a wiring housing member housing the electrical wiring. The recording device is electrically connected to the manuscript reading device by an electrical wiring. The rotating support member is configured so as to rotate the manuscript reading device relative to the recording device. The wiring housing member is positioned different from the rotating support member.

20 Claims, 3 Drawing Sheets

IMAGE FORMING APPARATUS INCLUDING A WIRING HOUSING MEMBER

CROSS-REFERENCE TO RELATED APPLICATIONS

This application is based on and claims the benefit of priority from the prior Japanese Patent Application No. 2005-251077, filed on Aug. 31, 2005; the entire contents of which are incorporated herein by reference.

BACKGROUND

1. Technical Field

The present invention relates to an image forming apparatus that includes a manuscript reading device and a recording device.

2. Description of Related Art

An image forming apparatus is known which, in order to make an apparatus body compact, includes a manuscript reading device on top of a recording device, wherein a discharge section into which printed paper is discharged is provided between the recording device and the manuscript reading device. In such an image forming apparatus, there is an example in which a mechanism which opens and closes the manuscript reading device with respect to the recording device is provided in order to facilitate taking out the paper stacked in the discharge section. (For example, refer to Japanese Patent No. 3,433,740)

In general, a power supply from the recording device to the manuscript reading device and a transmission and reception of image data between them are carried out, in which case a provision of a wiring in a support of the manuscript reading device can be considered.

SUMMARY

When opening and closing the manuscript reading device, in the event that the configuration is such that a wiring between the manuscript reading device and the recording device protrudes outward, a user can touch the wiring, and an improvident touch may cause a disconnection, a short circuit, garbled data and the like.

When the wiring is included between the manuscript reading device and the recording device, the wiring is installed concentrated in the support of the manuscript reading device, and there is the possibility of a disconnection, a breaking, and garbled data due to a noise.

According to an aspect of the invention, an image forming apparatus comprises: a manuscript reading device reading a manuscript and converting the manuscript into an image signal; a recording device printing on paper; at least one rotating support member connecting the manuscript reading device and the recording device, and a wiring housing member housing the electrical wiring. The recording device is electrically connected to the manuscript reading device by an electrical wiring. The rotating support member is configured so as to rotate the manuscript reading device relative to the recording device. The wiring housing member is positioned different from the rotating support member.

According to the above-aspect of the invention, an image forming apparatus can protect the wiring between the recording device and the manuscript reading apparatus, and can prevent garbled data.

DESCRIPTION OF THE EMBODIMENTS

An embodiment of the invention will hereafter be described using the drawings.

Figure 1:
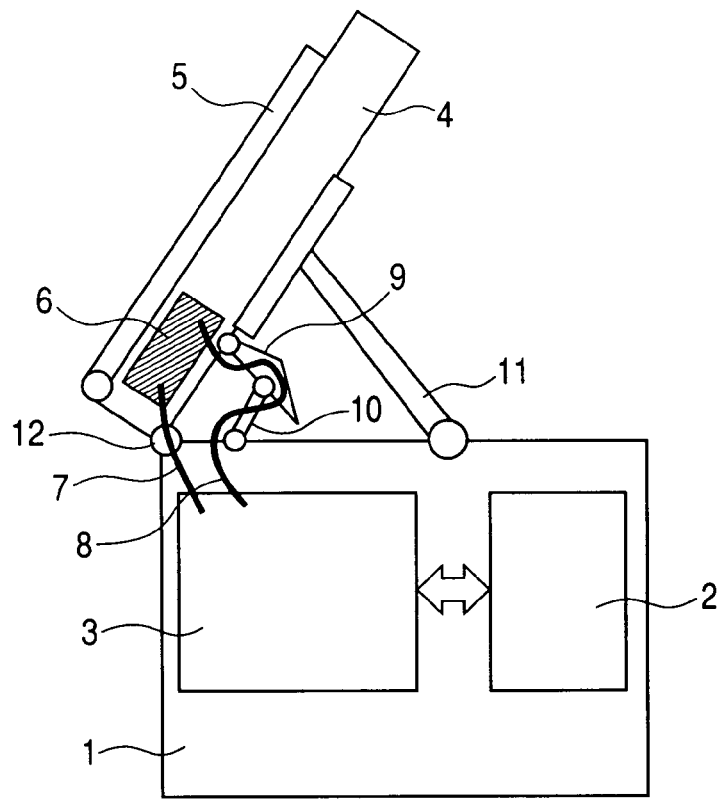
FIG. 1 is an exemplary schematic view of an image forming apparatus according to an embodiment of the invention.

As shown in FIG. 1, the image forming apparatus of the embodiment, which can be basically divided into a recording device 1 and a manuscript reading device 4, is generally called a complex apparatus having a printer function and the like. The recording device 1 uses general xerography, wherein a toner is supplied from a developing device and developed on a surface of a photoconductor which is charged by a charger. The toner developed is given a prescribed electric field and transferred to an intermediate body or a paper. Furthermore, the toner transferred to the paper is fused by a fuser and discharged to a paper discharge tray by a discharge roller, thus forming a print image. The paper is fed from a paper cassette and, as a feed roller is rotated in accordance with a printing timing, is fed to a registration roller, wherein a transfer is carried out by a transfer roller in accordance with the print image.

The manuscript reading device 4 is configured to read a manuscript, sandwiched between a transparent platen and a manuscript cover 5, by a manuscript sensor (not shown) included in the transparent platen. An optical sensor is used as the manuscript sensor, which uses a linear or planar shape. Of course, it is acceptable to use the method of scanning with a point like sensor. The linear sensor can read a planar image (the manuscript) by scanning. A CCD sensor or the like may be used as the planar sensor. The method of changing an image size using the above sensor may include using an optical lens or an image processing circuit.

Although there is an arrangement in which a support rack is used to connect the recording device 1 and the manuscript reading device 4, the recording device 1 and the manuscript reading device 4 are connected by a support provided on the recording device 1.

Figure 5:
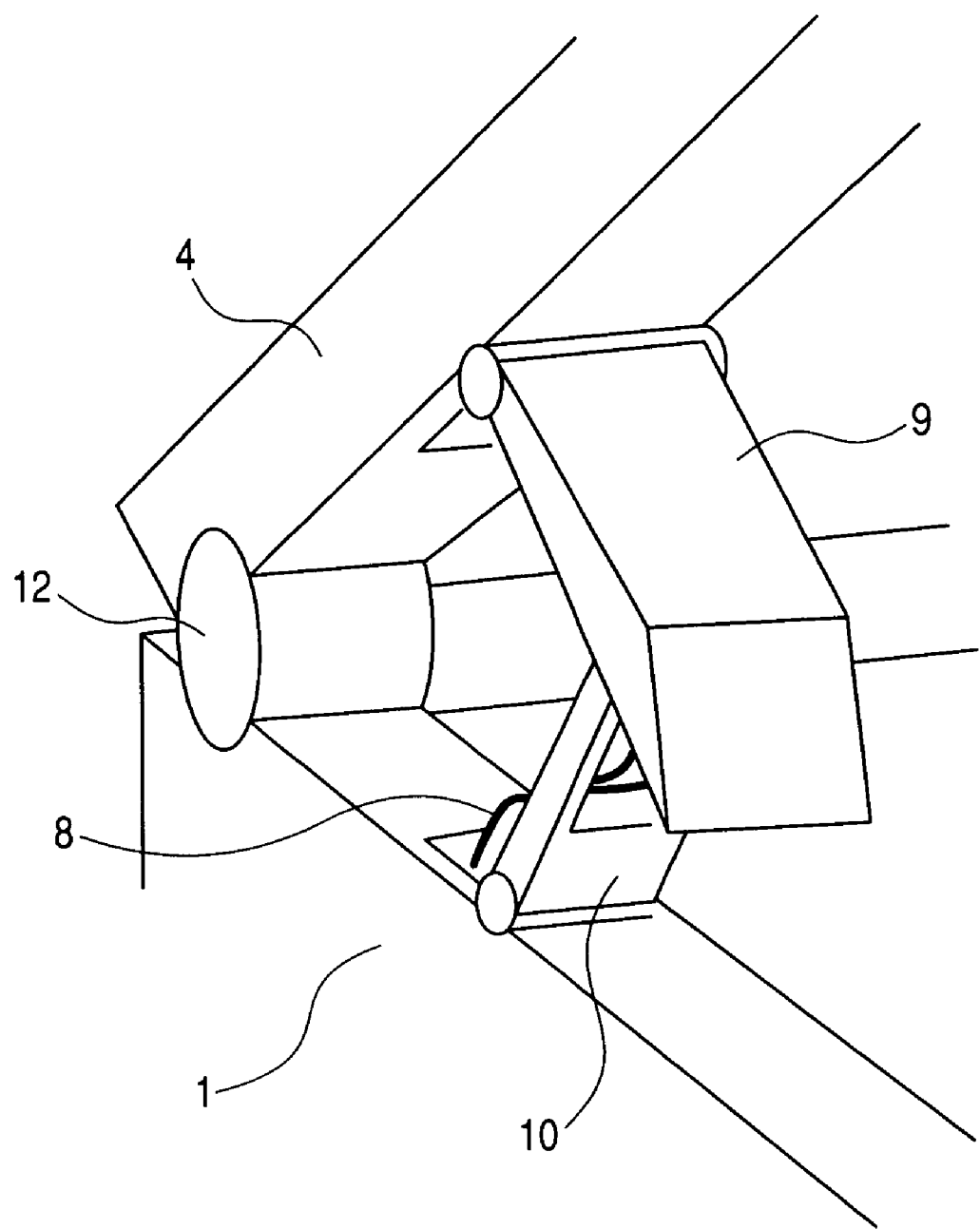
FIG. 5 is an exemplary perspective view of the vicinity of the wiring housing member.

The manuscript reading device 4 and the recording device 1 according to the embodiment, as well as being movable around one or more rotating support members 12 to cause the manuscript reading device 4 to rotate, include a wiring housing member, which houses a wiring, in a position different from that of the rotating support members 12. The provision of the rotating support members 12 enables the manuscript reading device 1 to rotate when carrying out replacement of recording device 1 consumables, replacement of a unit needing periodic replacement, and maintenance such as removal of jammed paper. For this reason, by opening an upper door of the image forming apparatus, the replacement and maintenance are possible, thus improving the operability of the image forming device. In this embodiment, the configuration is such that a pair of the rotating support members 12 is provided in the vicinity of each side of the recording device 1, as shown in FIG. 5, and a paper discharge section, which discharges the paper from the recording device 1, is provided in the vicinity of the rotating support members 12.

The manuscript reading device 4 is supported by a support lever 11, which is a support member, with respect to the recording device 1, thus preventing the manuscript reading device 4 from falling down during the maintenance. In the embodiment, the wiring housing member is located between the rotating support members 12 and the support lever 11.

In the embodiment, as the wiring to the manuscript reading device 4 is separated into at least two systems, a power system wiring 7 and a data system wiring 8. By this configuration, it is possible to prevent image data, transmitted through the data system wiring 8, from being garbled due to a noise occurring in the power system wiring 7. A read controller 6 of the manuscript reading device is provided in the manuscript reading device 4, wherein transmission and reception of the image data is carried out via the data system wiring 8 provided between the read controller 6 and a controller 3 of the recording device 1. Furthermore, the image data generated by the controller 3 is transmitted to an engine controller 2, wherein the paper is printed by an engine including the developing device, the charger, the photoconductor and the like.

The wiring housing member, including at least two parts, is configured to bend with the rotation of the manuscript reading device 4. The wiring housing member includes a first protection member 9 and a second protection member 10. When the manuscript reading device 4 opens, the first protection member 9 can prevent the wiring from being extracted from the wiring housing member and can prevent the wiring from making a contact with an open side. The second protection member 10 can prevent an involution of the wiring into the rotating support members 12. By using at least these two parts, the data system wiring 8 can be connected in its bent condition.

Figure 2:
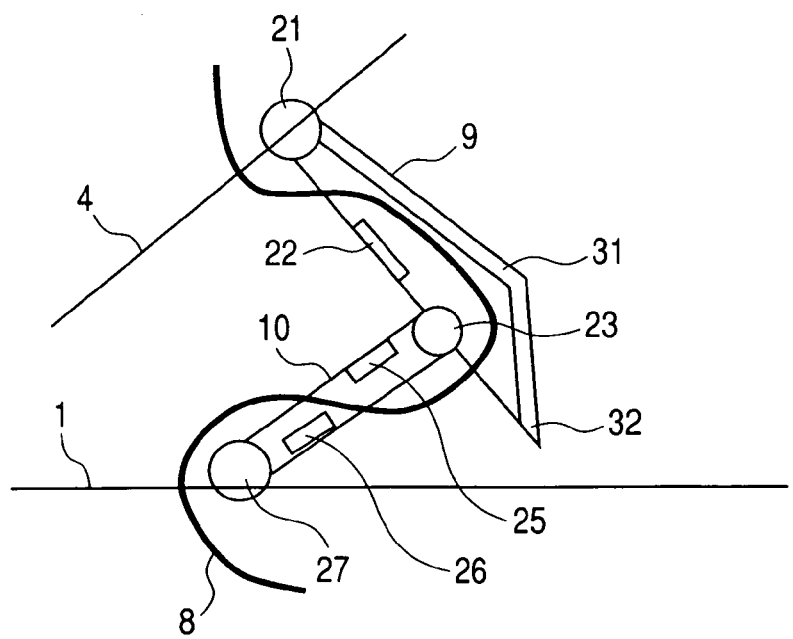
FIG. 2 is an exemplary schematic view of a wiring housing member according to the embodiment.

A description will hereafter be made using FIG. 2. The first protection member 9 is made long in order to protect the data system wiring 8 between a connection 21 with respect to the manuscript reading device 4 and a connection 27 with respect to the recording device 1. In particular, a wall 31 is provided on the open side, whereby, when the manuscript reading device 4 is opened, a touching of the data system wiring 8 from the open side can be prevented by the first protection member 9. Also, the data system wiring 8 can be prevented from protruding out on the open side. Furthermore, by using a guide 22, the wiring can be installed along the wall 31.

Figure 4:
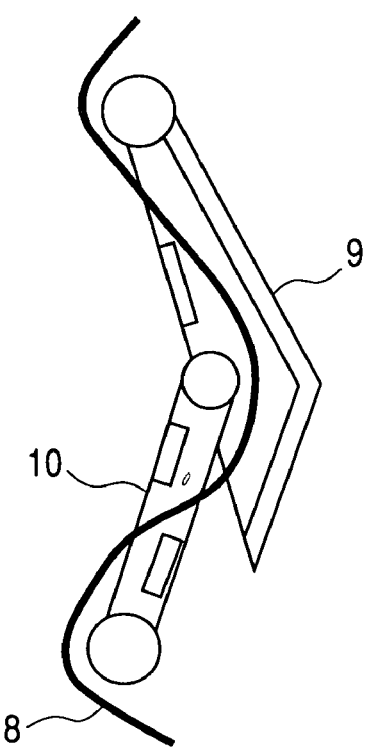
FIG. 4 is an exemplary schematic view of a condition in which the wiring housing member is extended.

The second protection member 10 is connected to the first protection member 9. A connection 23 therebetween can be provided not at an end 32 of the first protection member 9 but at a point located inwardly of the end 32. A configuration, for example, like a λ shape as shown in FIG. 2, makes it possible to prevent the data system wiring 8 from protruding out on the open side. As shown in FIG. 4, the end 32 comes close to the connection 27 of the second protection member 10, thereby enabling the data system wiring 8 to be protected.

Figure 3:
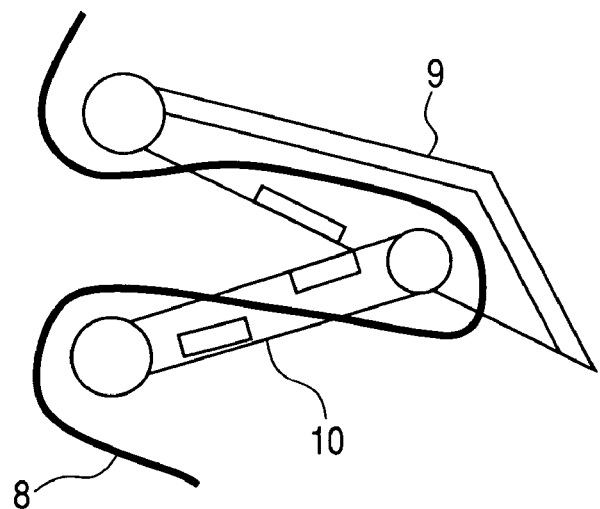
FIG. 3 is an exemplary schematic view of a condition in which the wiring housing member is bent.

A wall 25 of the second protection member 10 is placed on the rotating support member 12 side, thereby preventing the data system wiring 8 from being stuck in the rotating support member 12. The wall 25 and a wall 26 enable the data system wiring 8 to fit within the second protection member 10. Furthermore, the connecting portion between the first protection member 9 and the second protection member 10 can provide a box-shaped space when the wiring housing member extends as shown in FIG. 4. Also, when the wiring housing member bends, the box shape opens as shown in FIG. 3, whereby the bent portion of the data system wiring 8 can be provided with a large radius, thus making it possible to prevent the wiring from damaging.

The first protection member 9 is connected to the manuscript reading device 4 side. By this configuration, the first protection member 9 prevents the wiring from being extracted from the wiring housing member. This configuration can prevent a contamination due to dust and the like from above.

The pathway of the power system wiring 7 of the driving unit and the data system wiring 8, through which the image data is transmitted and received, form separate wiring pathways to the manuscript reading device 4. Also, the wiring using the wiring housing member is the data system wiring 8 through which the image data is communicated. The reason is that the power system wiring 7, which is a thick wiring, is placed around the rotating support members 12 and thus prevented from extending/contracting and bending drastically.

In some cases, a planar wiring is used as the data system wiring 8. As data can be transmitted and received with less current, the wiring can be made thin. For this reason, the planar wiring is unaffected by extension/contraction and bending, and is best suited to a wiring which is disposed inwardly between the manuscript reading device 4 and the recording device 1. On the contrary, although the planar wiring may be used as the power system wiring 7, as a stepping motor is often used as a motor (not shown), which is a driving device of the manuscript reading device 4, and also consumes more current, it is often the case that the planar wiring is not used.

In the embodiment, the recording device 1 has been described with an electrophotographic device as an example, but any printer including an inkjet method, a thermal transfer method or the like is applicable. Consequently, the invention can be applied to a complex apparatus configured by combining the printer and the manuscript reading device.

A description has been given of the case in which the wiring housing member uses two parts, but it is also acceptable to use three or more parts.

What is claimed is:

1. An image forming apparatus comprising:
    a manuscript reading device reading a manuscript and converting the manuscript into an image signal;
    a recording device printing on paper, the recording device electrically connecting to the manuscript reading device by an electrical wiring;
    at least one rotating support member connecting the manuscript reading device and the recording device, the rotating support member being configured so as to rotate the manuscript reading device relative to the recording device, and
    a wiring housing member housing the electrical wiring, the wiring housing member being positioned different from the rotating support member.

2. An image forming apparatus according to claim 1, wherein the wiring housing member is on a side of the recording device, and
    wherein the wiring housing member comprises at least two or more parts, and wherein the parts are configured to bend with a rotation of the manuscript reading device.

3. An image forming apparatus according to claim 2, wherein the wiring housing member comprises:

a first protection member which, when the manuscript reading device rotates open, prevents the electrical wiring from being extracted from the wiring housing member; and a second protection member preventing an involution of the electrical wiring into the rotating support member.

4. An image forming apparatus according to claim 3, wherein the first protection member comprises a length which is greater than a length of the second protection member.

5. An image forming apparatus according to claim 4, wherein the first protection member is connected to a manuscript reading device side.

6. An image forming apparatus according to claim 1, wherein the manuscript reading device includes a driving unit,
wherein the electrical wiring comprises;
a power system wiring through which power is transmitted from the recording device to a driving unit of the manuscript reading device, and
a data system wiring, through which the image data is transmitted from the manuscript reading device to the recording device, wherein the power system wiring and the data system wiring are separated into different paths, and
wherein the data system wiring is housed in the wiring housing member.

7. An image forming apparatus according to claim 6, wherein the power system wiring is disposed around the rotating support member.

8. An image forming apparatus according to claim 6, wherein the data system wiring comprises planar wiring.

9. An image forming apparatus according to claim 1, wherein the wiring housing member comprises:
a first protection member; and
a second protection member, moveably connected to said first protection member.

10. An image forming apparatus according to claim 9, wherein a wall is provided on the first protection member on the open side, and
wherein if the manuscript reading device is opened, said wall prevents the electrical wiring from being touched from the open side.

11. An image forming apparatus according to claim 10, wherein a guide on the first protection member holds the electrical wiring against the wall.

12. An image forming apparatus according to claim 9, wherein the second protection member is connected to the first protection member at a point located inwardly of the end of the first protection member.

13. An image forming apparatus according to claim 12, wherein if the wiring housing member bends, a bent portion of the electrical wiring is allowed a large radius.

14. An image forming apparatus according to claim 9, wherein the second protection member comprises a first wall on the rotating support member side, thereby preventing the electrical wiring from being held in the rotating support member.

15. An image forming apparatus according to claim 14, wherein the second protection member comprises a second wall on the side opposite the rotating support member, for allowing the electrical wiring to fit within the second protection member.

16. An image forming apparatus according to claim 1, wherein, when the manuscript reading device is closed toward the recording device, the wiring housing member is accommodated thereinside.

17. A wiring housing member comprising:
a first protection member; and
a second protection member connected to said first protection member at a point located inwardly of an end of said first protection member,
wherein opposite sides of said first protection member and said second protection member are connected to machine bodies, said machine bodies moving in relation to one another in a bending direction of said first protection member and said second protection member.

18. A wiring housing member according to claim 17, further comprising:
a guide disposed on the first protection member, said guide holding the wiring against the first protection member.

19. A wiring housing member according to claim 17, wherein the second protection member comprises a first wall and a second wall on sides opposite each other, allowing the wiring to fit within the second protection member.

20. An image forming apparatus comprising:
a document reading device which reads a document and converting the document into an image signal;
a recording device connected to the document reading device by a wiring; and
a wiring housing member which houses the wiring,
wherein the wiring housing member moves relative to machine bodies on which said wiring housing member is connected.

* * * * *